United States Patent

[11] 3,596,711

[72] Inventors Hubert Rothert
Berlin;
Eugen Renz, Mulheim (Ruhr); Helmut Widder, Essen-Heidhausen, all of, Germany
[21] Appl. No. 836,720
[22] Filed June 26, 1969
[45] Patented Aug. 3, 1971
[73] Assignee Licentia Patent-Verwaltungs-G.m.b.H. Frankfurt am Main, Germany
[32] Priority June 28, 1968
[33] Germany
[31] P 17 63 597.1

[54] COOLING APPARATUS
8 Claims, 4 Drawing Figs.

[52] U.S. Cl. 165/86, 165/104
[51] Int. Cl. F28d 11/00
[50] Field of Search 165/86, 87, 89, 90, 80, 47, 104, 67

[56] References Cited

UNITED STATES PATENTS

| | | | |
|---|---|---|---|
| 2,886,746 | 5/1959 | Saby | 165/104 |
| 2,288,341 | 6/1942 | Addink | 165/104 |
| 3,113,614 | 12/1963 | Schubert et al. | 165/67 |

*Primary Examiner*—Charles Sukalo
*Attorney*—Spencer & Kaye

ABSTRACT: Cooling apparatus for electrical components includes a chamber for retaining cooling liquid therein, electrical components which generate heat mounted within the chamber, means mounting the chamber for rotation about an axis and means for limiting the entry of impurities into the chamber means.

Inventors:
Hubert Rothert
Eugen Renz
Helmut Widder
By: Spencer & Kaye
Attorneys

COOLING APPARATUS

BACKGROUND OF THE INVENTION

This invention relates to a cooling arrangement for electrical apparatus, and more particularly to such an arrangement in which the deposit of impurities which would adversely affect the efficiency of the cooling operation is prevented.

Rotating electrical apparatus such as motors and generators often have electrical components such as resistors, rectifiers and the like which generate substantial quantities of heat. Provision of a special arrangement for dissipating this heat is often necessary. In many cases this can be accomplished by use of cooling air. In other cases the use of a cooling liquid is necessary, particularly when the apparatus is of compact construction and the components which generate heat are located in a closely confined space.

Rotating rectifiers and other electrical components have been located in cooling chambers through which a cooling liquid flows. In prior art devices this liquid coolant is also used to cool other parts of the electrical machine. As a result the coolant often becomes heavily contaminated with impurities, which tend to be deposited at intricately shaped surfaces. Such surfaces however are often located at the very structural elements which are to be cooled. As a result they become substantially covered by the deposits of impurities. The final result is a reduction in the efficiency of the dissipation.

SUMMARY OF THE INVENTION

Among the objects of the present invention is the provision of cooling apparatus in which the deposits of impurities by cooling fluid is minimized.

A further object of the invention is the provision of an arrangement in which coolant circulates more uniformly and with less changes in direction and which consequently requires less power for its circulation.

Briefly stated, these and other objects of the invention are achieved by providing rotating liquid-cooling chambers which surround the electrical components which generate heat, and in which entry of impurities which are likely to reduce the efficiency of heat dissipation are retarded.

DESCRIPTION OF THE PREFERRED EMBODIMENTS

Figure 1:
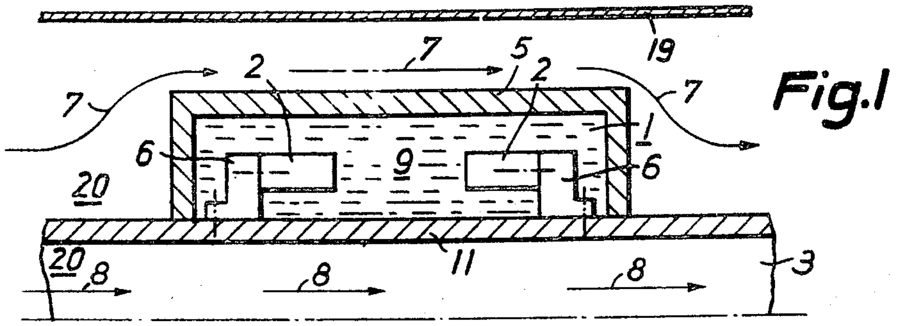
FIG. 1 is a cross-sectional view showing one-half of a symmetrically arranged cooling apparatus according to the present invention including a shaft and a chamber, one-half of each being shown.

Referring now to the drawings in FIG. 1 there is shown a cooling arrangement including a generally cylindrical chamber 1 in which electrical components 2 which generate heat are disposed. The chamber and electrical components are mounted for rotation on the wall 11 of a hollow shaft 3. The electrical components 2 are connected to shaft 3 by brackets 6. The walls 5 of chamber 1 are completely closed and a coolant liquid 9 is permanently enclosed therein. The amount of the coolant liquid 9 is, in its cold state, slightly less than the volume of the interior of the chamber 1. This permits expansion of the liquid when it is heated by the electrical components 2.

An additional cooling arrangement for removing heat from coolant liquid 9 in the chamber 1 is also provided. The coolant fluid 20 that is used for removing heat from other components of the other electrical apparatus is arranged to flow about chamber 1. A stream 7 passes about the exterior wall 5 of the chamber and a stream 8 passes through the center of shaft 3 which is hollow. Heat transfer takes place through wall 5 of the chamber and wall 11 of the shaft. While the additional coolant 20 may contain substantial quantities of impurities these are unable to enter the closed chamber 9 and accordingly the electrical components 2 are protected from a buildup of deposits which would reduce the efficiency of heat transfer.

Preferably oil is used for the coolants 9 and 20, but it also is possible to use any other cooling liquid, for instance water. The coolant fluid 20 is made to flow in the streams 7 and 8 by a conventional cooling pump which is mounted on the shaft 3 of the rotating electrical apparatus (not shown). The stream 7 is confined in its flow past the chamber 1 by the wall structure 19.

In some uses the electrical components 2 may generate heat in such large quantities that 1 transfer via the first coolant 9 to the second coolant 20 is not sufficient. In such cases the arrangement described in FIG. 2 may be useful. This structure is generally similar to that of FIG. 1 and corresponding parts have corresponding reference numerals. In this arrangement the chamber 1, the electrical components 2, the brackets 6 and the shaft 3 are of generally similar shapes and mounting. However, the shaft wall 11 contains a number of inlet openings 4 which pass from the hollow interior of the shaft to the interior of the chamber 1. Wall 11 accordingly serves as a sievelike screen. The exterior walls 5 of the chamber 1 have outlet openings 12 extending therethrough. The coolant fluid 9, like the coolant fluid 20 in the FIG. 1 arrangement flows through the interior of the shaft and about the exterior of the chamber in streams 7 and 8 as in the FIG. 1 arrangement. However, the coolant is diverted in a stream 10 into the interior of the chamber 1 from the stream 8 through the inlet openings 4, and out the outlet openings 12 to join the stream 7.

The shaft wall 11 has a screening effect, and for the most part impurities carried in stream 8 do not pass through the openings 4. However, once the fluid enters within the chamber 1 it is rotated as the shaft and the chamber rotates. Such impurities as do enter are subjected to centrifugal forces and tend to either flow out through the openings 12, or to be deposited on the interior of the chamber wall 5. As a result, deposits on the electrical components 2 are minimized.

Again preferably oil is used for the coolant 20 which, of course, in this case has to be of the same kind as the liquid 9. A cooling liquid other than oil could also be used. The coolant fluid 20 and accordingly the liquid 9 are put under pressure by a rotating conventional cooling pump similar as described for FIG. 1. Again the stream 7 is confined in its flow past the chamber 1 by the wall structure 19.

The inlet openings 4 and the outlet openings 12 are as a maximum of a size of one-hundredth square inch.

Figure 2:
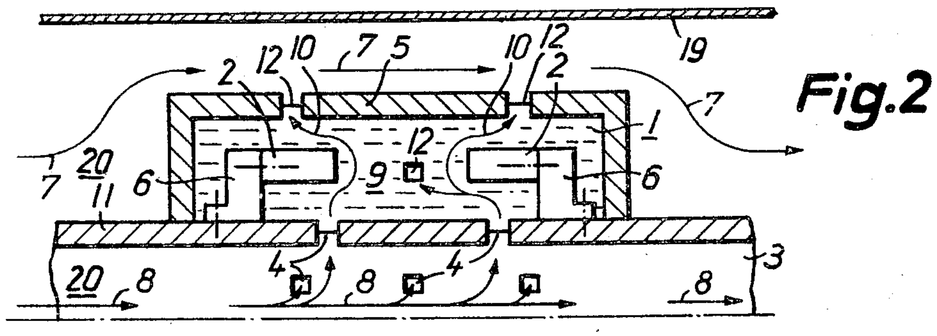
FIG. 2 is a sectional view similar to FIG. 1 of a cooling arrangement according to another embodiment of the invention.
Figure 3:
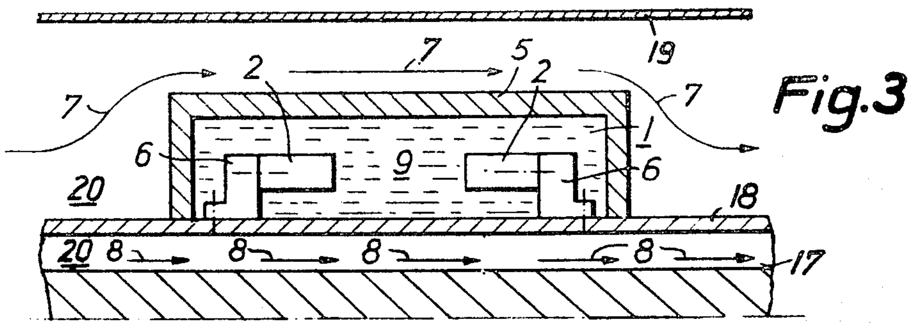
FIG. 3 is a sectional view similar to FIG. 1 of a cooling arrangement according to another embodiment of the invention.
Figure 4:
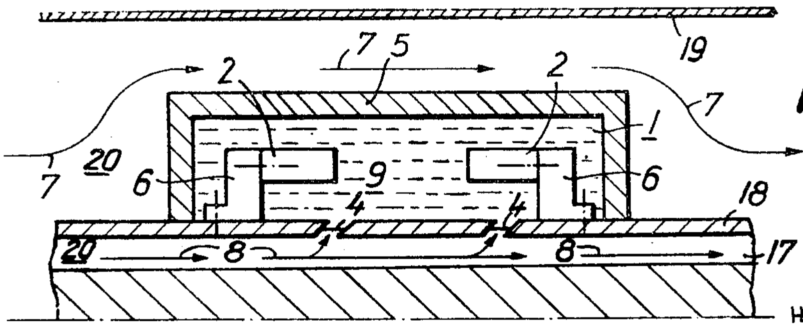
FIG. 4 is a sectional view similar to FIG. 2 of a cooling arrangement according to another embodiment of the invention.

Instead of a hollow shaft as disclosed in FIGS. 1 and 2 a solid shaft 17 as shown in FIGS. 3 and 4 may be used. To have a path for the stream 8 the shaft 17 is surrounded by a sheath 18 which leaves a space through which the coolant flows. Otherwise the cooling arrangement according to FIG. 3 works as is described for FIG. 1.

According to FIG. 4 there may be provided openings 4 in the sheath 18, so that the coolant can enter into the chamber 1. The external outlet openings 12 are eliminated.

Additionally the openings 4 are disposed approximately parallel to the direction of flow of the coolant 20 through the bores, that is obliquely through the wall of the sheath 18.

In this case only a small amount of the coolant 20, branching off of the stream 8, will enter into the openings 4, but this might be sufficient to remove the heat.

The openings 4 again are of a size of approximately of one-hundredth square inch.

Another heat transfer takes place through the wall 5 of the chamber 1 to the external stream 7 of the cooling fluid 20 which again at the outside is confined by the wall structure 19.

It will be understood that the above description of the present invention is susceptible to various modifications, changes and adaptations.

We claim:

1. A cooling arrangement for rotating electrical components comprising, in combination:
   a. chamber means for retaining a cooling liquid therein,
   b. electrical components which generate heat mounted within said chamber means,
   c. means mounting said chamber means for rotation about an axis together with said electrical components, and
   d. means limiting the entry of impurities into said cooling liquid within said chamber means.

2. A combination defined in claim 1 wherein said means limiting the entry of impurities into the cooling liquid is a completely closed fluidtight wall of a heat-conducting material which surrounds and permanently retains the cooling liquid within the chamber means.

3. The combination defined in claim 4 wherein said means limiting the entry of impurities into the cooling liquid is a wall located between said rotational axis and said electrical components, said wall having inlet bores for the entry of cooling liquid into the chamber means, and solid portions blocking the flow of impurities therein.

4. The combination defined in claim 1 wherein said chamber means includes wall portions of heat-conducting material, and further including means for moving a stream of coolant past the exterior of said chamber wall portions as said chamber is rotated whereby heat generated by the electrical components may be carried by said cooling liquid to said chamber wall, pass therethrough by heat conduction, and be carried away by the coolant in said stream.

5. A cooling arrangement for rotating electrical apparatus comprising, in combination:
   a. chamber means having completely closed fluidtight walls of a heat conducting material,
   b. coolant liquid contained within said chamber,
   c. electrical components which generate heat in operation mounted within said chamber, and
   d. means mounting said electrical components and said chamber for rotation.

6. A cooling arrangement for rotating electrical apparatus comprising, in combination:
   a. chamber means for retaining a cooling liquid therein,
   b. electrical components which generate heat mounted within said chamber means,
   c. means mounting said chamber means and said electrical components for rotation, about an axis,
   d. means for axially moving a stream of coolant liquid past the exterior surfaces of the walls of said chamber means as said chamber means is being rotated, and
   e. sievelike inlet bore means for the entry of cooling fluid into the chamber means located in the wall of said chamber between said electrical components and said axis of rotation.

7. The cooling arrangement as defined in claim 5 including means for axially moving a stream of coolant past the exterior surfaces of the walls of said chamber means as said chamber means is being rotated.

8. The cooling arrangement as defined in claim 6 wherein said chamber means includes outlet bore means in the wall of said chamber means opposite said wall having said inlet bores located therein.